United States Patent [19]

Connors

[11] Patent Number: 5,025,613

[45] Date of Patent: Jun. 25, 1991

[54] TAIL BAG AND METHOD FOR HORSE

[76] Inventor: Joseph C. Connors, Hurricane Hill Farm, R.D. 4, Auburn, N.Y. 13021

[21] Appl. No.: 290,380

[22] Filed: Dec. 29, 1988

[51] Int. Cl.⁵ .............................................. B68B 5/04
[52] U.S. Cl. ...................................... 54/78; 119/105
[58] Field of Search ...................... 54/78; 119/105, 95, 119/123, 143

[56] References Cited

U.S. PATENT DOCUMENTS

| 31,285 | 7/1899 | McClellan | 54/78 |
| 127,918 | 6/1872 | Parson et al. | 54/78 |
| 148,367 | 3/1874 | Howard | 54/78 |
| 209,737 | 11/1878 | Weide | 54/78 |
| 212,836 | 3/1879 | Briggle | 54/78 |
| 385,721 | 7/1888 | Muntz | 54/78 |
| 697,242 | 4/1902 | Gavitt | 54/78 |
| 4,378,667 | 4/1983 | Velarde | 54/78 |

FOREIGN PATENT DOCUMENTS 30478 7/1931 Australia ............................ 119/105

OTHER PUBLICATIONS

Eiser's Catalog #2012, p. 44.

Primary Examiner—John Weiss
Attorney, Agent, or Firm—John C. Fox

[57] ABSTRACT

A horse's tail is completely protected from dirt and abrasion by the horse, such as during stabling or transit of the horse, by a tail bag which completely covers the horse's tail, which fits around the base of the tail without chafing, and which folds the lower part of the tail up to prevent the horse from treading on it.

10 Claims, 1 Drawing Sheet

U.S. Patent
June 25, 1991
5,025,613
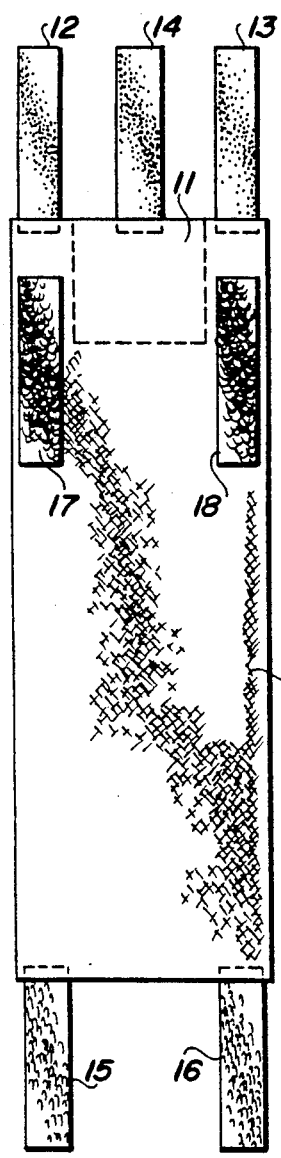
Fig. 1
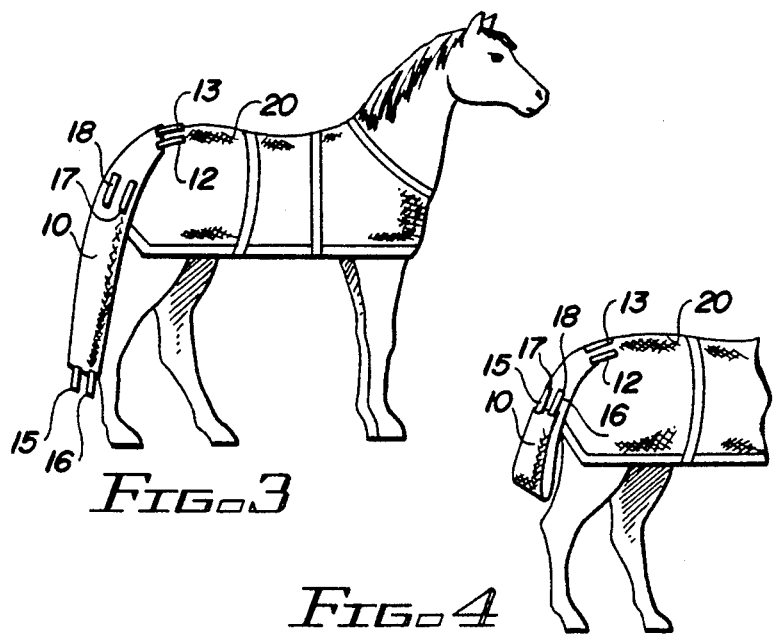
Fig. 3
Fig. 4
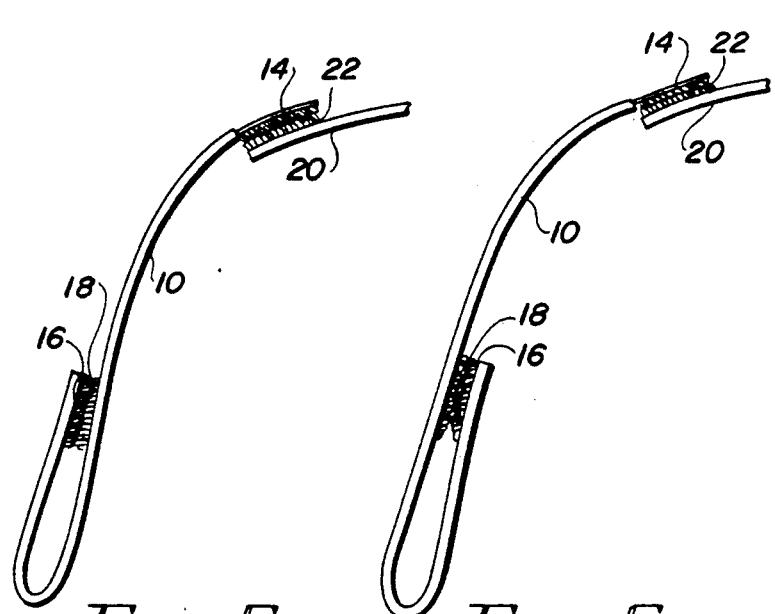
Fig. 5
Fig. 6
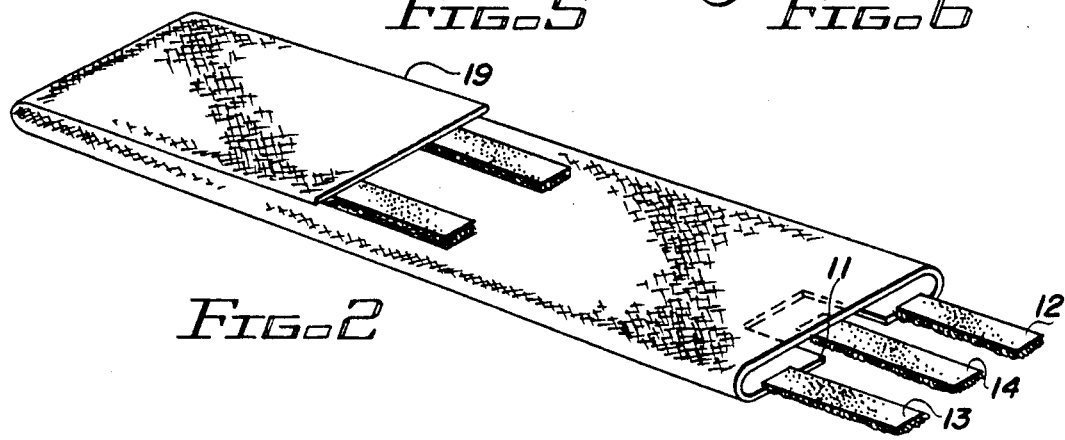
Fig. 2

TAIL BAG AND METHOD FOR HORSE

BACKGROUND OF THE INVENTION

This invention relates to a device and method for protecting a horse's tail, such as during stabling or transit of the horse.

Various means have been devised over the years for protecting a horse's tail. For example, a very early U.S. Pat. No. 822,788, provides a device that is secured to the animal while in his stall and is adapted to prevent him from rubbing his tail against the sides of the stall. The device consists of two bars secured one on each side of the dock and other bars to connect them together and pass around the dock, the whole device held in place by straps secured to a girth passed around the horse. Another type of tail protector is described in U.S. Pat. No. 2,136,032. This device consists of an adjustable protector frame extending along the sides of the horse and around the tail of the horse and fixed in position by a harness. A similar tail protecting device is shown in U.S. Pat. No. 4,141,197.

All of the above devices share several common drawbacks. First, while they all protect some of the upper portion of the tail from damage due to rubbing against a stall or other enclosure, such as a trailer, they do not protect the lower part of the tail which is also subject to damage, due not only from rubbing against a hard surface, but also to the horse treading on the tail when the rump is lowered, for example to maintain balance during transit. Furthermore, all of these devices leave the tail uncovered and therefore exposed to dirt and other foreign particles such as bedding, and subject to breaking and pulling out of hairs of the tail. A horse's tail cannot be brushed but must be cleaned by separating the hairs and picking out the debris, an exacting and time-consuming process. Furthermore, all of these devices are awkward to handle and put on, and all require cumbersome harnessing arrangements.

A simpler tail protector along with the installation technique are shown and described in EISER'S Catalog No. 2012, page 44. This tail protector comprises a sock or bandage made of stretchable material and having a string or tape at one end and a separate cylindrical applicator. The bandage is installed by first sliding it onto the applicator, then sliding the applicator up to the base of the tail, then holding the tape with one hand and pulling the applicator down along the tail ti release the bandage. This installation technique also tends to be cumbersome. In addition, the bandage tends to restrict circulation in the tail, and also leaves a considerable portion of the lower end of the tail unprotected.

OBJECTS AND SUMMARY OF THE INVENTION

Accordingly, objects of the invention include providing a tail protector for a horse which is easy to put on and remove, comfortable for the horse, and protects the entire tail from dirt, bedding and other foreign particles, rubbing, chafing, treading and/or soiling by defecation of the horse, as well as breaking or pulling out of hairs of the tail.

In accordance with the invention, a tail protector for a horse comprises: a bag open at one end and closed at the opposite end, the bag having dimensions sufficient to comfortably slip over a horse's tail, the bag having on one side of the open end a slot to accommodate the base of the tail; means for fastening the top of the bag to the horse, e.g., via a covering such as a sheet or blanket, or a sursingle; as well as means for attaching a lower portion of the bag to an upper portion of the bag.

In accordance with another aspect of the invention, a method is provided for protecting a horse's tail in which the tail is placed in the bag, the top of the bag is pulled up over the horse's tail until the slotted portion of the bag surrounds the base of the horse's tail, the bag is then attached to the horse, for example, via a sheet or sursingle, and then a lower portion of the bag containing the part of the horse's tail below the dock is folded up, preferably to just under the end of the dock, and secured to an upper portion of the bag to maintain the tail in the folded position.

Such a tail bag and method have the advantages of ease of installation, protection of the complete tail from damage due to rubbing against a surface, or from foreign particles such as dirt, bedding, shavings, etc. In addition, folding the tail up has the advantage of lifting it away from the horse's hooves, making it extremely difficult for the horse to lower itself sufficiently to endanger the tail by treading upon it. In addition, the slot allows the bag to be pulled high enough to prevent the horse from defecating inside the bag as well as to completely cover of the upper part of the outside of the tail, without chafing the base of the tail.

BRIEF DESCRIPTION OF THE DRAWING

FIG. 1 is a front view of one embodiment of a tail bag in accordance with the invention, in an unfolded position;

FIG. 2 is a perspective view of the embodiment of FIG. 1, in a folded position;

FIG. 3 is a side view of a horse wearing a cooler and having the tail bag attached to the sheet in the unfolded position;

FIG. 4 is a side view of the horse of FIG. 3 with the tail bag in the folded position; and FIG. 5 and FIG. 6 are schematic diagrams showing alternate embodiments of the tail bag of the invention.

DESCRIPTION OF THE PREFERRED EMBODIMENTS

Referring now to FIG. 1, tail bag 10 may be fabricated of any flexible, durable and abrasion-resistant material, for example, nylon. Slot 11, cut from the top of the rear surface of the bag, may be reinforced with stitching, braiding or other material if desired. Strips 12 and 13 of a self-adhering fabric such a VELCRO are attached to the top of the rear surface of the bag near the edges. VELCRO strip 14 is attached to the top of the front surface of the bag in a central position opposite slot 11. The attachment surfaces of VELCRO strips 12, 13 and 14 are on the rear side of the strips. VELCRO strips 15 and 16 are attached to the bottom of the bag near the edges, and in this embodiment have their attachment surfaces on the front side of the strips. VELCRO strips 17 and 18 are placed on the front surface of the bag near the side of the bag in locations vertically aligned with strips 15 and 16, and also have their attachment surfaces on the front side.

FIG. 2 shows in perspective the bag of FIG. 1 in the folded position, with VELCRO strips 15 and 16 attached to strips 17 and 18, respectively, holding the bottom of the bag in the folded position. Preferably the placement of strips 17 and 18 on the bag is such that substantially all of the horse's tail which extends below the dock is contained in the folded portion of the bag, indicated by reference numeral 19.

In practice, the horse's tail is first placed in the bag and the bag is pulled up until the slot 11 surrounds the base of the horse's tail and the bag is secured to the horse, for example, by attaching VELCRO strips 12 through 14 to corresponding VELCRO strips on a sheet 20 as shown in FIG. 3. Next, the bag with tail inside is folded up, and VELCRO strips 15 and 16 are attached to strips 17 and 18 as shown in FIG. 4.

Bags of different lengths may be provided to accommodate variations in tail lengths from horse to horse. By way of example, dimensions for a long length bag are 51½" long by 10½" wide, with the slot being 5½" long and 4½" wide, and the VELCRO strips being 6" long by 3" wide. The top of strips 17 and 18 are located about 6" from the top of the bag. Dimensions of a short length bag are a length of 39½" and a width of 10½", a slot 5¼" long by 4" wide, and VELCRO strips 4½" long by 2" wide. The tops of the strips 17 and 18 are located 6" from the top of the bag.

Such dimensions are, of course, exemplary and may be varied to suit the size of the horse's tail to be covered, the characteristics of the material used for the bag and the attachment means. While self-adhering fabric strips such as VELCRO are preferred attachment means due to their well known convenience of use, other attachment means may be substituted, for example, snaps, eyelets, straps, strings or ties.

In addition, the placement of the attachment means and the method of folding may be varied. As shown in FIG. 5, the velcro strips 17 and 18 may be placed lower down on the front surface of the bag and strips 15 and 16 may be attached entirely to the front surface of the bag so that upon folding of the bag up and attachment of the velcro strips 15 and 16 to strips 17 and 18, the strips are not visible when the folded bag is viewed from the rear of the horse.

FIG. 6 shows a further variation in which the bottom of the bag is folded inwardly instead of outwardly in which case strips 15, 16, 17 and 18 are attached to the rear surface of the bag rather than the front surface.

Central velcro strip 14 may be omitted if desired. However, it has the advantage of keeping the top of the bag closed and of enhancing the strength of the bond between the bag and the sheet.

The bag and method thus described provide complete protection for the horse's tail without the necessity for chafing contact with the tailbone or with the hair of the tail. In addition, the looseness of the bag provides freedom of circulation in the tail and comfort for the horse.

The invention may be embodied in other specific forms without departing from the spirit or essential characteristics described herein. The present embodiments are merely illustrative and should not be considered to be restrictive. The scope of the invention is indicated by the appended claims, and all variations which come within the meaning and range of equivalency of the claims are therefore intended to be embraced therein.

I claim:

1. A tail protector for a horse comprising: an elongated bag open at one end and closed at the other end, the bag having a front surface, a rear surface, sides and upper and, lower portions, the bag dimensioned to completely enclose a horse's tail, the upper portion of the rear surface of the bag defining a slot for accommodating the base of the tail, means for attaching the top of the bag to the horse; and means for attaching the lower portions end of the bag to the upper portion of the bag to maintain the lower portion in a folded position, whereby in use of the horse's tail is substantially completely enclosed within the bag and a lower portion of the tail below the dock is folded up in the lower portion of the bag.

2. The tail bag of claim 1 in which there are three attachment means at the top of the bag, two such means attached to the rear surface of the bag near the sides and the third such means attached to the front surface of the bag in a central position opposite the slot.

3. The bag of claim 2 in which the attachment means comprise strips of self-adhering fabric.

4. The bag of claim 3 in which the attachment means comprises VELCRO strips.

5. The bag of claim 1 in which the means for attaching the lower portion of the bag to the upper portion of the bag are located so that in use substantially all of the tail below the dock is folded in the lower portion of the bag.

6. The bag of claim 5 in which the attachment means comprise strips of self-adhering fabric.

7. The bag of claim 6 in which the attachment means comprise VELCRO strips.

8. A method for protecting a horse's tail comprising placing the tail in a bag having a slot in the upper portion of its rear surface for accommodating the base of the horse's tail, attaching the top of the bag to the horse; folding a lower portion of the bag upward and attaching the lower portion of the bag to an upper portion of the bag, whereby a portion of the tail below the dock is folded up in the lower portion of the bag.

9. The method of claim 8 in which the lower portion of the bag and tail are folded outwardly.

10. The method of claim 9 in which the lower portion of the bag and tail are folded inwardly.

* * * * *